United States Patent [19]

Saxton et al.

[11] Patent Number: 4,580,665
[45] Date of Patent: Apr. 8, 1986

[54] QUICK CONNECT BRAKE COUPLING

[75] Inventors: Floyd G. Saxton, Troy; Joseph W. Gucwa, Ortanville; Charles H. Lantz, Rochester, all of Mich.

[73] Assignee: Rockwell International Corporation, Pittsburgh, Pa.

[21] Appl. No.: 40,348

[22] Filed: May 18, 1979

[51] Int. Cl.⁴ ............................................. F16D 65/52
[52] U.S. Cl. ................. 188/79.5 K; 403/299; 403/24; 403/11
[58] Field of Search ............. 403/299, 79, 157, 43–48, 403/326, 21, 24, 11; 85/32 K; 285/305; 188/79.5 K

[56] References Cited

U.S. PATENT DOCUMENTS

| 781,067 | 1/1905 | Hewitt | 403/44 |
| 1,604,690 | 10/1926 | Halaby | 85/32 K |
| 2,535,016 | 12/1950 | Launder | 285/305 X |
| 3,471,186 | 10/1969 | Luebbert et al. | 403/326 X |
| 4,009,765 | 3/1977 | Leskovec et al. | 403/46 X |
| 4,146,115 | 3/1979 | Tazelaar | 403/299 X |

FOREIGN PATENT DOCUMENTS 6907 of 1902 United Kingdom ................. 403/46

Primary Examiner—Andrew V. Kundrat

[57] ABSTRACT

A quick connect coupling for connecting a threaded push-rod to a clevis of a brake actuating lever, the coupling comprises the combination of a collar having an internal bore threaded for engagement with the push rod, a head at one end of the collar and a recess forming a shoulder spaced from the head, latching means carried by the clevis and biased into a first position extending internally of a bore provided to the clevis and latch displacing means carried by the collar adjacent to the shoulder. During assembly the latch displacing means serves to displace the latching means upon axial insertion of the collar into the bore and the latching means returns to its first position and engages the shoulder provided to the collar to prevent withdrawal of the collar from the clevis bore.

19 Claims, 6 Drawing Figures

QUICK CONNECT BRAKE COUPLING

BACKGROUND OF THE INVENTION

This invention is directed to a coupling for connecting a threaded rod to a second element having a bore provided therein and more specifically, to a coupling for quickly connecting the threaded push rod of an air motor to the clevis of a brake actuating lever and automatic slack adjustor on a vehicle assembly line without the need for any other tools.

More particularly, this invention is directed to a coupling for quickly connecting the threaded push rod of an air motor to the clevis of a brake actuating lever and automatic slack adjustor of the type disclosed in U.S. Pat. No. 3,949,840 which issued to J. C. Cumming, et al, on April 13, 1976. Such a device will hereinafter be referred to as a brake actuating lever which, for purposes of this invention, will be used to describe a brake actuating lever that includes an automatic slack adjusting mechanism as well as a brake actuating lever without an automatic slack adjusting mechanism. Other brake adjusting levers of the type with which the present invention may also be utilized are described in U.S. Pat. Nos. 3,507,369, 3,526,303, U.S. Pat. No. Re. 26,965, U.S. Pat. Nos. 3,121,478, 3,351,164 and 3,371,755.

The brake actuating levers which the present invention is particularly directed are utilized primarily in a rotary cam actuated internally expanding brake assembly. The brake actuating lever is splined at one end to a shaft which rotates the cam and the other end is connected by means of a clevis to the push rod of an air motor. Various connections have been used between the threaded push rod of the air motor and the clevis. In one conventional connection the threaded push rod is threaded into a tabbed bore provided in the clevis and upon adjustment to provide the proper length, a locknut is threaded down and seated tight against the surface of the clevis to prevent loosening of the push rod. This requires rotary movement of the push rod relative to the clevis or the clevis relative to the push rod and may require either removing the clevis from the brake actuating lever or the push rod from the air motor. Removal or disassembly of component parts, of course, requires whatever additional steps may be necessary to reassemble those parts at the point of installation on the vehicle assembly line.

One approach to avoid such disassembly has been to provide both a locknut and an externally threaded ferrule or yoke adaptor to the threaded push rod. During assembly the push rod is brought into juxtaposition with a threaded bore provided to the clevis. The yoke adaptor is threaded to the bore in the clevis and then the locknut is tightened against the yoke adaptor to prevent disassembly during service. This avoids the need to disassemble parts of the brake actuating lever or the air canister, but it still requires the use of tools in tightening two separate nut members in a relatively confined space on a vehicle assembly line.

SUMMARY OF THE INVENTION

The present invention avoids certain of the foregoing problems of the prior art by providing a coupling for quickly connecting a threaded push rod to the clevis of a brake actuating lever which comprises the combination of a collar having an internal bore threaded for engagement with the push rod, a head at one end of the collar and a recess forming a shoulder spaced from the head, latching means carried by the clevis and biased into a first position extending internally of a bore provided to the clevis and latch displacing means carried by the collar adjacent to the shoulder. During assembly the latch displacing means serves to displace the latching means upon axial insertion of the collar into the bore and the latching means returns to its first position and engages the shoulder provided to the collar to prevent withdrawal of the collar from the bore.

In the preferred embodiment, the latching means is a spring carried by the clevis and the collar is comprised of a cylindrical body having a head at one end, a tapered, conical surface at the other end and a spring engaging groove extending circumferentially around the cylindrical body intermediate the head and the tapered, conical surface. Upon insertion of the collar to the bore provided to the clevis, the tapered, conical surface displaces the spring latching means until such time that the spring latching means is biased into the spring engaging groove thereby preventing withdrawal of the collar from the bore.

BRIEF DESCRIPTION OF THE DRAWINGS

In the drawings wherein like reference numerals refer to like parts.

DESCRIPTION OF THE PREFERRED EMBODIMENT

Figure 1:
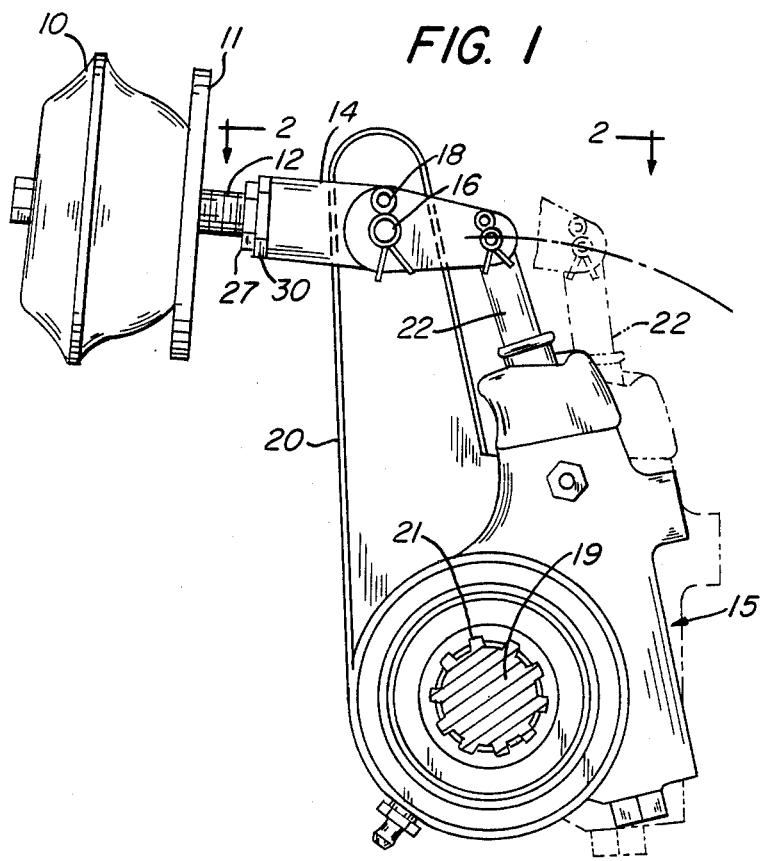
FIG. 1 is a side elevation showing an assembly of a threaded push rod to the clevis of a brake actuating lever.
Figure 2:
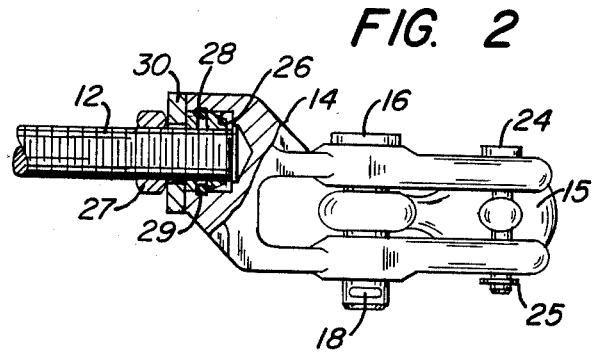
FIG. 2 is a top plan view, partly in section, showing part of the assembly of FIG. 1.

In FIGS. 1 and 2 the present invention is shown in the form of an assembly of a threaded push rod connected to a cylindrical bore provided to the clevis of a brake actuating lever. With reference to FIG. 1 there is shown an air motor 10 secured to a plate 11 which in turn is rigidly secured to a brake support or directly to a vehicle axial. A push rod 12 extending from the air motor 10 is connected to the clevis 14 of which is pivotally connected to the brake actuating lever 15 by means of a pin 16 and cotter key 18. The brake actuating lever 15 in turn is splined to the rotary actuating shaft 19 of a cam brake assembly not shown.

The brake actuating lever 15 is described in greater detail in U.S. Pat. No. 3,949,840 but consists essentially of an elongated housing forming a lever 20 having a worm gear 21 at one end. The worm gear 21 is internally splined for connection to the rotary actuating shaft 19. A worm, provided internally of the lever 15, engages the worm gear 21 and is connected to a rod 22 by means of an automatic adjusting mechanism not shown. The rod 22 is pivotably connected to the end of the clevis 14 by means of a pin 24 and cotter key 25. Air supplied to the motor 10 extends the push rod 12 thereby rotating the brake actuating lever 15 clockwise about the rotary cam shaft 19 to the position shown by the phantom lines. When the air pressure is released from the motor 10 the assembly returns to the position shown in FIG. 1. In the event the arcuate movement of the brake actuating lever 15 is greater than some predetermined movement considered satisfactory for normal running clearance, the automatic adjusting mechanism will rotate the worm, the worm gear 21 and the rotary actuating shaft to a position providing the desired running clearance between the brake shoes and a surrounding brake drum.

Figure 3:
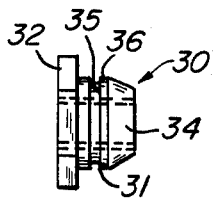
FIG. 3 is a side elevation of the collar shown in FIG. 2.
Figure 4:
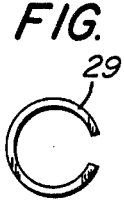
FIG. 4 shows another element of the assembly of FIGS. 1 and 2.

The coupling between the push rod 12 and the clevis 14 is best shown by FIG. 2. The clevis 14 is provided with a cylindrical bore 26 having a recess in the form of a groove 28 extending circumferentially around the internal cylindrical wall of the bore. A split spring ring 29 such as that shown by FIG. 4 is provided to the groove 28. The internal diameter of the split spring ring 29 is slightly less than the internal diameter of the bore 26. A locknut 27 and a collar 30 such as that shown by FIG. 3, are threaded to the push rod 12. The collar is comprised of a cylindrical body portion 31 having a hexagonal head 32 at one end, a conical surface 34 at the other end, and a groove 35 extending circumferentially around the cylindrical body 31 intermediate the hexagonal head 32 and the conical surface 34. The conical surface 34 is tapered to gradually increase to the diameter of the cylindrical body 31 of the collar 30 and the groove provides a shoulder 36 adjacent the conical surface 34. The split, spring ring 29 is carried by the clevis groove 28 and extends partly into the collar groove 35 thereby providing an interference fit between the clevis bore 26 and the collar 30. Any attempt to axially withdraw the collar 30 from the bore 26 will cause the shoulder 36 of collar groove 35 to engage or abut the split, spring ring 29 which prevents further movement or axial withdrawal of the collar 30 and push rod 12 from the clevis bore 26.

On a vehicle assembly line, the air motor 10 and the brake actuating lever 15 may be provided to the frame or their respective related components at different points in time and/or at different locations on the line. The motor 10 and the actuating lever 15 may be obtained from different sources and the brake actuating lever 15 may be provided to the OEM as an integral part of a rotary cam actuate brake assembly. In any event, the present invention provides for a quick connection of the air motor push rod 12 to the clevis 14 of a brake actuating lever 15 at any predetermining point on the assembly line.

In practice, the locknut 27 and collar 30 are threaded to the push rod 12 but only to the extent that the push rod 12 is flush with or extends only slightly from the tapered, conical end of the collar 30. The locknut 27 may be tightened to the collar 30 at that time. Then at the appropriate location on the assembly line, the push rod and collar 30 are manually, axially inserted in the clevis bore 26 to effect the desired connection.

Upon axial insertion of the collar 30 the tapered, conical surface 34 connects the split, spring ring 29 and expands that ring forcing it back into the groove 28 provided to the bore 26, thereby permitting the cylindrical body portion 31 of the collar to slidably pass the expanded split ring until the collar groove 35 becomes aligned with the groove 28. At this point, the split, spring ring 29 will snap into the groove 35 and provide an interference fit between the grooves 28 and 35 thereby preventing withdrawal of the collar. Once assembled the collar 30 cannot be removed from the clevis 14 but the push rod 12 may be removed for normal service purposes by loosening the locknut 27 and rotating the hexagnol head 32 of the collar 30 to back the push rod 12 out of the collar.

Figure 6:
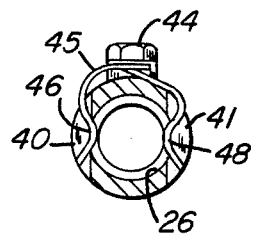
FIG. 6 is a sectional view taken along the line 6—6 of FIG. 5.
Figure 5:
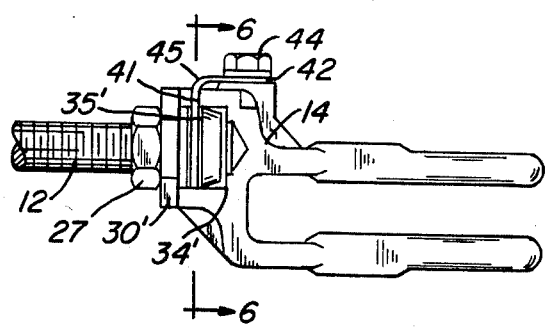
FIG. 5 is a top plan view similar to FIG. 2 showing an alternate embodiment of the invention.

An alternate embodiment is shown by FIGS. 5 and 6. In FIGS. 5 and 6, elements identical to those previously described are identified by the same reference numerals.

The clevis of the embodiment shown in FIGS. 5 and 6 is slotted across the top and bottom as shown at 40 and 41 to provide access from the exterior of the clevis to the interior of the cylindrical bore 26. The clevis 14 is also drilled and tapped at 42 to accommodate a machine screw 44. A spring 45, best shown in FIG. 6 is formed at its midpoint with a loop that fits around the shank of the machine screw 44 and is trapped between the head of the screw and the clevis body proper. The ends of the spring 45 extend through the slots 40 and 41 across the body of the clevis and are formed with detents at 46 and 48. The detents 46 and 48 project into the cylindrical bore 26. During assembly a locknut 27 and a collar 30' are threaded to the end of the push rod 12 in the same manner as previously described for the embodiment of FIGS. 1 and 2. The collar 30' is tapered or chamferred at the end 34'. As the push rod 12 and collar 30' are axially inserted to the cylindrical bore 26, the tapered outer end 34' of the collar contacts the detents 46 and 48 provided to the spring 45 and expands the two legs of the springs 45 out into the slot 40 and 41 until the groove 35' provided circumferentially around the collar 30' is aligned with the slots 40 and 41. When the groove 35' becomes axially aligned with the slots 40 and 41, the detents 46 and 48 are biased into the groove 35' and prevent the collar 30' from being axially withdrawn from the bore 26.

The springs 29 and 45 of the two described embodiments thus constitute latching means carried interiorly of the cylindrical bore provided to the clevis which are displaced by the tapered, conical surface provided to the collar 30 or the tapered end provided to the collar 30' to pass a portion of the cylindrical body of each respective collar until the grooves provided to the collar align with the spring biased latching means.

Both embodiments provide the desired quick connect assembly of a push rod to a clevis. The embodiment of FIGS. 1 and 2 offers the additional advantage that the split, spring ring can be provided internally of the clevis bore without requiring an additional element such as the machine screw of the FIGS. 5 and 6 embodiment which might be accidentally removed or lost during servicing.

The invention may also be embodied in other specific forms without departing from the spirit or essential characteristics thereof. The foregoing description is, therefore, to be considered as illustrative and not restrictive, the scope of the invention being defined by the appended claims, and all changes which come within the meaning and range of equivalency of the claims are, therefore, intended to be embraced thereby.

What is claimed and desired to be secured by Letters Patent is:

1. A coupling for connecting a threaded rod to a second element having a bore provided therein comprising the combination of a collar having an internal bore threaded for engagement with said rod, a head at one end of said collar and a recess forming a shoulder spaced from said head, latching means carried by said second element, said latching means being biased to a first position extending internally of said bore and displaceable to a second position permitting passage of said shoulder, and latch displacing means carried by said collar adjacent said shoulder whereby said latch displacing means will displace said latching means upon insertion of said collar into said bore and said latching means will return to said first position and engage said shoulder thereby preventing withdrawal of said collar from said bore.

2. The coupling defined by claim 1 wherein said latching means is a spring and said latch displacing means is a tapered surface provided to said collar.

3. The coupling defined by claim 2 wherein said tapered surface is a conical surface provided at the end of said collar opposite from said head.

4. A coupling device for connecting a threaded rod to a second element having a bore provided therein comprising the combination of a collar having an internal bore threaded for engagement with said threaded rod, a head at one end of said collar and a recess intermediate said head and the other end portion of said collar, a second recess formed interiorly of said bore, spring means carried by one of said recesses and interfering with axial passage of said collar into said bore, and spring displacing means provided adjacent the other said recess whereby said spring displacing means will displace said spring into said one recess upon axial insertion of said collar into said bore to permit passage thereof and said spring will return to its original position and engage said other recess thereby preventing axial withdrawal of said collar.

5. The coupling device defined by claim 4 wherein said spring means is carried by said second recess formed interiorly of said bore.

6. The coupling device defined by claim 5 wherein said recess provided to said collar is a groove provided circumferentially around said collar and said spring displacing means is a tapered surface provided at said other end of said collar.

7. The coupling device defined by claim 4 wherein said recess provided interiorly of said bore is a groove provided circumferentially around said bore, said spring means is a ring carried by said groove around said bore and normally of smaller diameter than said bore, and said spring displacing means is a conical surface provided at said other end of said collar and adapted to engage and expand said ring upon axial insertion of said collar into said bore thereby permitting passage of said collar until said ring contracts and engages said recess provided to said collar.

8. An assembly of a threaded push rod to a cylindrical bore provided to a clevis of a brake actuating lever comprising the combination of a collar having an internal bore threaded to said push rod, said collar having a head at one end, a tapered surface at the other end and a groove extending circumferentially around said collar adjacent said tapered surface, and a spring carried by said clevis and extending interiorly of said bore into said groove to prevent axial withdrawal of said collar and said push rod from said clevis.

9. The assembly defined by claim 8 wherein said collar includes a tapered surface at the end opposite from said head and said tapered surface is adapted to engage and displace said spring upon axial insertion of said collar thereby permitting passage of said collar until said spring engages said groove.

10. The assembly defined by claim 9 wherein said tapered surface is a conical surface.

11. The assembly defined by claim 8 wherein said spring is a split ring of smaller internal diameter than said cylindrical bore and said split ring provides an interference fit between said groove extending around said collar and a groove extending circumferentially around the interior of said cylindrical bore.

12. The assembly defined by claim 11 wherein said collar includes a conical surface at the end opposite from said head and said conical surface is adapted to engage and expand said split ring upon axial insertion of said collar into said bore thereby permitting passage of said collar until said split ring contracts and engages said groove extending around said collar.

13. A collar for connecting a threaded push rod to the clevis of a brake actuating lever comprising a cylindrical body having a head at one end, a conical surface of a diameter gradually increasing to the diameter of said cylindrical body at the other end and a spring engaging groove extending circumferentially around said cylindrical body intermediate said head and said conical surface.

14. In a vehicle braking system, a brake actuating lever, a yoke pivotally connected to said lever, a thrust rod, a fluid pressure responsive actuator connected to said thrust rod for urging the latter in a brake application effecting and brake releasing directions and means attaching said yoke to said thrust rod, said attaching means comprising: said yoke including a recess having an entrance through which one end of said thrust rod extends, a collar movable axially on said thrust rod, said collar including latch displacing means, and other means carried by said yoke and projecting into said recess for displacement by said latch displacement means and engagement with said collar to connect said collar to said yoke.

15. The invention of claim 14 wherein said other means includes biased latch means interconnecting said yoke and said collar.

16. The invention of claim 15 wherein said collar has a circumferentially extending groove on the outer surface thereof, said biased latch means penetrates the wall of said recess to engage said groove.

17. The invention of claim 16 wherein said biased latch means is a spring clip presenting a pair of legs, said yoke having a pair of openings intersecting said recess, each of said legs extending through a corresponding one of said openings and engaging opposite portions of said groove.

18. The invention of claim 17 wherein said yoke defines a transverse thrust receiving surface circumscribing the entrance to said recess through which one end of the thrust rod extends, and means on said collar engaging said thrust receiving surface.

19. The invention of claim 14 wherein said yoke defines a transverse thrust receiving surface circumscribing the entrance to said recess, and means on said collar engaging said thrust receiving surface.

* * * * *